United States Patent
Bruckert

(10) Patent No.: US 6,169,906 B1
(45) Date of Patent: Jan. 2, 2001

(54) METHOD OF TRANSMITTING MESSAGES IN A DISPATCH CALL

(75) Inventor: Eugene J. Bruckert, Arlington Heights, IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/047,022

(22) Filed: Mar. 24, 1998

(51) Int. Cl.[7] .................................................. H04Q 1/00
(52) U.S. Cl. .......................... 455/518; 455/519; 455/522; 455/524
(58) Field of Search .................................. 455/404, 439, 455/512, 513, 521, 519, 525, 526, 518, 527, 508, 522, 59, 63; 370/441, 296, 389, 331, 465, 468

(56) References Cited

U.S. PATENT DOCUMENTS

| | | |
|---|---|---|
| 5,387,905 | 2/1995 | Grube et al. . |
| 5,414,796 * | 5/1995 | Jacobs et al. .................... 704/221 |
| 5,448,620 | 9/1995 | Gershkovich et al. . |
| 5,506,837 * | 4/1996 | Sollner et al. .................... 370/296 |
| 5,507,009 | 4/1996 | Grube et al. . |
| 5,901,363 * | 5/1999 | Toyryla ............................ 455/527 |
| 5,914,958 * | 6/1999 | Chinitz et al. .................... 370/441 |
| 5,960,362 * | 9/1999 | Grob et al. ....................... 455/527 |
| 5,983,114 * | 11/1999 | Yao et al. ........................ 455/509 |
| 6,021,326 * | 2/2000 | Nguyen ............................ 455/422 |

* cited by examiner

Primary Examiner—William G. Trost
Assistant Examiner—Temica M. Davis
(74) Attorney, Agent, or Firm—Susan L. Lukasik; Jeffrey K. Jacobs

(57) ABSTRACT

Communication units (107 and 109) are distinguished between preferred units and non-preferred units. The same message content is transmitted (207) to the preferred units at a preferred quality, such as at a preferred transmission rate, and to the non-preferred units (209) at a non-preferred rate, such as one-half the preferred transmission rate. The bandwidth saved can be reallocated for other messages, thereby resulting in a more efficient use of resources for a dispatch call.

18 Claims, 3 Drawing Sheets

METHOD OF TRANSMITTING MESSAGES IN A DISPATCH CALL

FIELD OF THE INVENTION

This invention relates to communication systems, including but not limited to transmitting messages in a dispatch call.

BACKGROUND OF THE INVENTION

The basic operation and structure of a two-way wireless communication system, such as a cellular telephone system or a land mobile communication system, is well known. Two-way wireless communication systems typically comprise one or more communication units (e.g., vehicle-mounted or portable communication units in a land mobile system and communication unit/telephones in a cellular system), also known as mobile stations, and one or more repeaters, also known as base stations or base transceiver stations, that transceive information via radio frequency (RF) communication resources. These communication resources may be narrow band frequency modulated channels, time division multiplex slots, frequency pairs, code division multiple access (CDMA) resources, and so forth. Two-way wireless communication systems may be organized as trunked communication systems, where a plurality of communication resources is allocated amongst a group of users by assigning the repeaters on a communication-by-communication basis within an RF coverage area.

Two-way wireless communication systems service many different types of calls, including one-to-one calls, telephone interconnect calls, and dispatch calls. Dispatch calls may be useful when it is desired for a large number of users to communicate at one time. Many cellular systems, however, do not support dispatch calls because dispatch calls are generally one-to-many calls, that may require a large number of communication resources in order to reach all of the members of the talkgroup for which the dispatch call is targeted. For example, if a particular system has 10 cells, and at least one member of the targeted talkgroup is present in each of those cells, then a communication resource from each cell must be allocated to support the dispatch call. Further, dispatch calls may be longer calls, often reaching lengths of 15 or more minutes, making such allocation of a communication resource very costly in terms of resources.

Accordingly, there is a need for a method of providing dispatch calls on a two-way wireless communication system, and in particular a two-way wireless cellular communication system, such that a more efficient use of communication resources support the dispatch call.

BRIEF DESCRIPTION OF THE INVENTION

DESCRIPTION OF A PREFERRED EMBODIMENT

Figure 1:
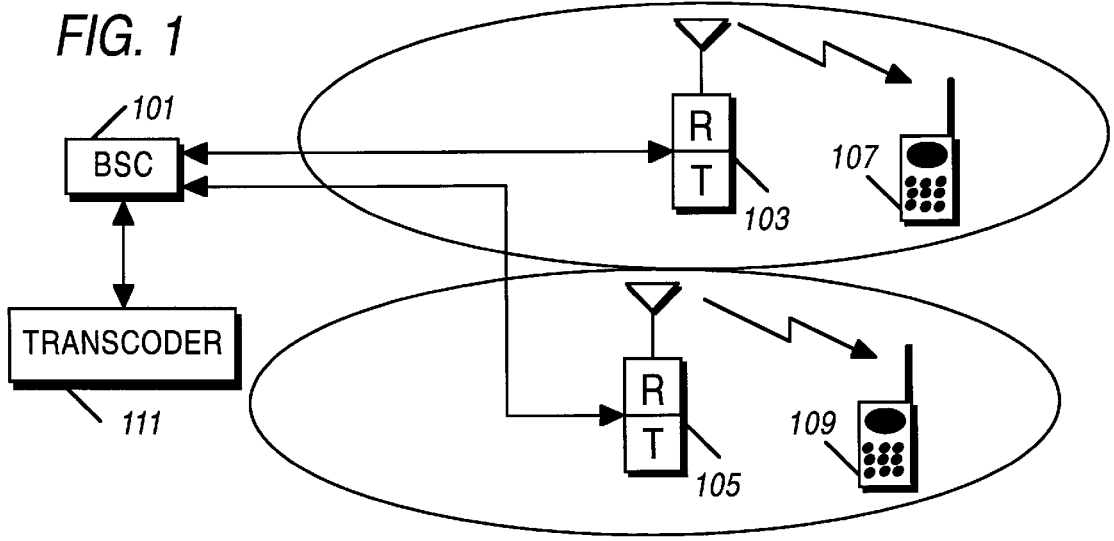
FIG. 1 is a block diagram of a wireless communication system in accordance with the invention.

The following describes an apparatus for and method of transmitting messages in a dispatch call such that more efficient use of communication resources is provided. Communication units are distinguished between preferred units and non-preferred units. The same message content is transmitted to the preferred units at a preferred quality, such as at a preferred transmission rate, and to the non-preferred units at a non-preferred rate, such as one-half the preferred transmission rate. The bandwidth saved can be reallocated for other messages, thereby resulting in a more efficient use of resources for a dispatch call.

A method of the present invention comprises the steps of establishing a dispatch call in a wireless communication system and determining a first preferred communication unit (MS). A first part of a message is transmitted to at least the first preferred communication unit at a preferred quality, and the first part of the message is transmitted to at least one communication unit that is not a preferred communication unit at a quality less than the preferred quality. The preferred quality may be a first transmission rate, a first transmission power, or a first transmission power and a first transmission rate, and the quality less than the preferred quality may be a rate slower than the first transmission irate, a power less than the first transmission power, or a power less than the first transmission power and a rate less than the first transmission rate. The first transmission rate may be a vocoder transmission rate. The method may further comprise the steps of determining a second preferred communication unit, transmitting a second part of the message to at least the second preferred communication unit at the preferred quality, and transmitting the second part of the message to at least one communication unit that is not a preferred communication unit at a quality less than the preferred quality. The method may further comprise the steps of determining that the first preferred communication unit is no longer preferred and transmitting a second part of the message to at least the first preferred communication unit that is no longer preferred at the quality less than the preferred quality. The preferred communication unit may compare an outbound signal to a received signal and mute the preferred communication unit's reception if the outbound signal and the received signal are substantially the same. The wireless communication system may be a CDMA system and/or a cellular system. The method may further comprise the steps of transmitting, by an originating communication unit, a communication; receiving, at a first base station, the communication; sending the communication to a transcoder; and transcoding, by the transcoder, the communication into the first part of the message at the preferred quality and into the first part of the message at the quality less than the preferred quality. The first part of the message may be sent at the preferred quality to the first base station. The first part of the message may be sent at the quality less than the preferred quality to a base station not servicing a preferred communication unit. The first part of the message may be transmitted to two or more preferred communication units at the preferred quality and may be transmitted to two or more communication units at a quality less than the preferred quality.

A method of the present invention comprises the steps of establishing a dispatch call in a wireless communication system, assuming all communication units participating in the dispatch call are non-preferred communication units, and transmitting a first part of a first message to the non-preferred communication units at a non-preferred quality. A part of a second message is received from a first communication unit, and the first communication unit is considered as a first preferred communication unit. A second part of the first message is transmitted to at least the first preferred communication unit at a preferred quality, and the second part of the first message is transmitted to at least one communication unit that is not the first preferred communication unit at the non-preferred quality. The step of transmitting the first part of the first message to the non-preferred communication units at the non-preferred quality may be performed by all base stations participating in the dispatch call. The step of transmitting the second part of the first message to at least the first preferred communication unit at the preferred quality may be performed by a base station servicing the first preferred communication unit in the dispatch call. The step of transmitting the second part of the first message to at least one communication unit that is not the first preferred communication unit at the non-preferred quality may be performed by a base station servicing not servicing the first preferred communication unit in the dispatch call. The method may further comprise the steps of transmitting, by an originating communication unit, a communication; receiving, at a first base station, the communication; sending the communication to a transcoder; and transcoding, by the transcoder, the communication into the first part of the first message at the non-preferred quality.

A diagram of a two-way wireless communication system is shown in FIG. 1. Although in the preferred embodiment the communication system is a CDMA communication system, the present invention may be successfully integrated into land mobile communication systems, TDMA systems, and other types of wireless communication systems that provide dispatch call services. A BSC (base station controller) 101, such as a BSC available from Motorola, Inc., provides network control for a plurality of BTSs (base transceiver stations), also known as base stations, 103 and 105. The base stations 103 and 105, such as a BS available from Motorola, Inc., transmit signals to one or more communication units, also known as mobile stations, 107 and 109. The BTS 103 or 105 may transmit at either a preferred signal quality, such as normal signal quality, or at a non-preferred quality, such as a lower quality than the preferred quality. A transcoder 111, which may be part of, or a separate unit coupled to, the BSC 101, transcodes inbound (reverse channel or up link) signals into the preferred quality signal and the non-preferred quality signal. The transcoder 101 may be a TXDR available from Motorola, Inc. Although only two base stations are shown in FIG. 1, the present invention may be successfully practiced with many more base stations.

Figure 2:
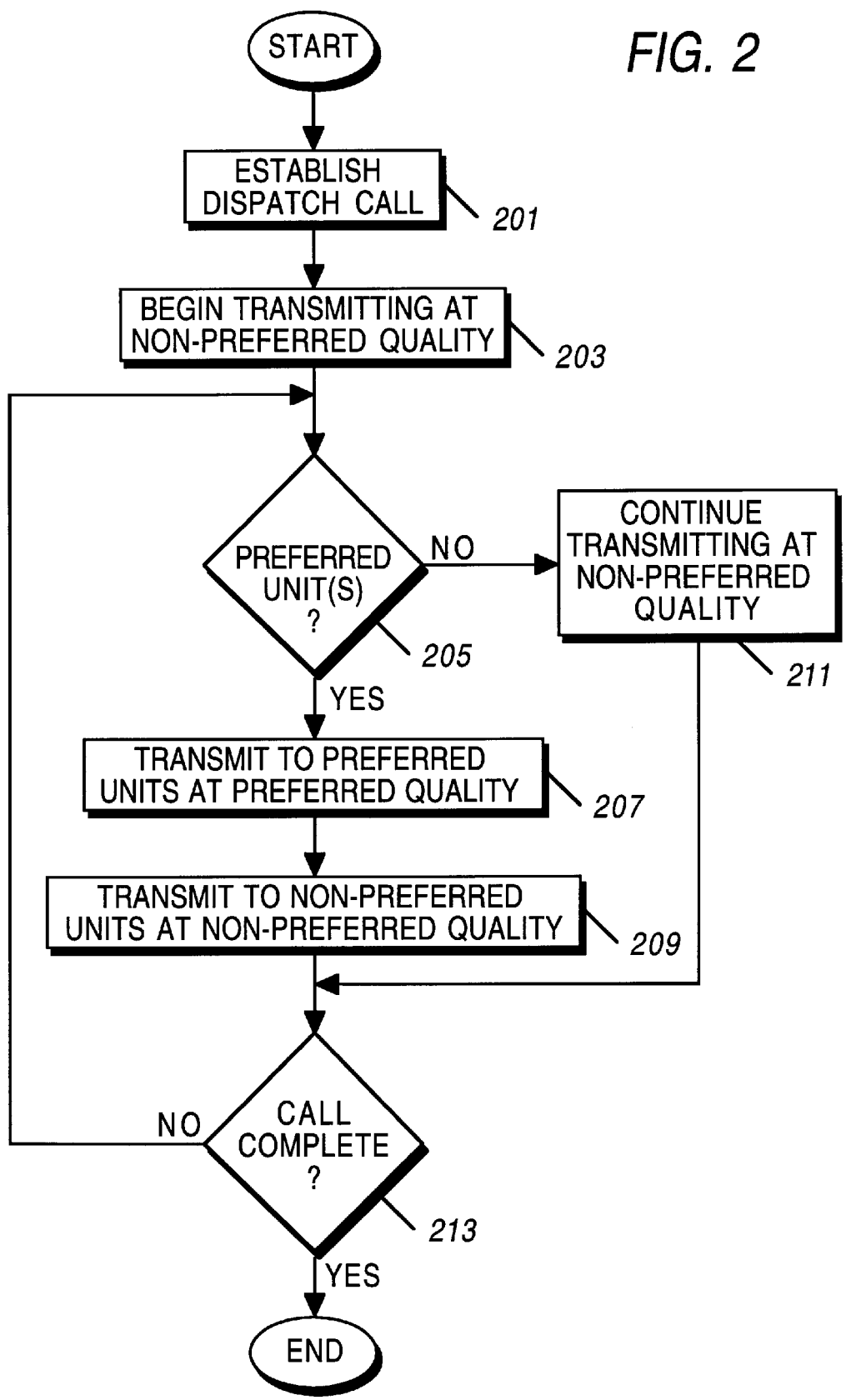
FIG. 2 is a flowchart showing a method of transmitting dispatch messages at preferred quality and non-preferred quality in accordance with the invention.

A flowchart showing a method of transmitting dispatch messages at preferred quality and non-preferred quality is shown in FIG. 2. At step 201, a dispatch call is established. Many ways of establishing a dispatch call are known in the art. A dispatch call may be initiated by either a communication unit 107 or a dispatcher through a console (not shown) operating in concert with the BSC 101 and/or a BTS 103 or 105. In general, a dispatch call may be originated by determining which communication units 107 are to be included in the call, allocating communication resources within each cell where the call will take place, sending at paging message, also known as a talkgroup call grant, including instructions as to which communication resource (s) to use, to each of the intended communication units for the call. The paging message may be sent periodically, including throughout the dispatch call, in order to include communication units that did not receive the initial paging message. At step 203, the originating device begins transmitting the dispatch message at a non-preferred quality (as will be described later) on the outbound (forward channel or down link) channel to the units that are to participate in the call. Typically, the dispatch message is repeated through the base stations 103 and 105 to the communication units 107 and 109 receiving the call.

At step 205, it is determined if a preferred communication unit is present for the dispatch call established at step 201. There may be one or more preferred communication units for a particular call, which preferred communication units may serially be considered as preferred communication units or simultaneously preferred, or a combination. In the preferred embodiment, determination of a preferred communication unit is made by considering a communication unit that communicates on the inbound or reverse channel on the dispatch call. Alternatively, a preferred communication unit may be a communication unit that has twice transmitted on inbound or reverse channel during the dispatch call. In the preferred embodiment, a communication unit considered a preferred communication unit for a fixed time after it transmits on the inbound or reverse channel. Each time a unit transmits on the inbound or reverse channel, the timer is reset for that communication unit. Other methods of determining what communication units are preferred include having a stored list of preferred communication units and allowing a communication unit to elect being preferred. If it is determined that a preferred communication unit is present at step 205, the process continues with step 207.

At step 207, the outbound (reverse channel) message is transmitted at a preferred quality to all present preferred communication units for this call. The preferred quality may be a transmission rate, which is a vocoder transmission rate in the preferred embodiment. The preferred quality may alternatively be a transmission power, or a combination of transmission power and a transmission rate. In the preferred embodiment, transmission to the preferred communication units is performed by transmitting by the one or more base stations that support the preferred communication units, i.e., by the base stations with which the preferred communication units have set-up a communication link. In other words, if two preferred communication units exist in the system, and one communication unit resides in a first base station's coverage area, and a second preferred communication unit resides in a second base station's coverage area, then the first base station and the second base station transmit the message at the preferred quality. Should there be any other communication units participating in the dispatch call within range of the first base station or the second base station, those communication units will also receive the message at the preferred quality.

At step 209, the same message content that was transmitted at step 207 is transmitted at step 209 at a non-preferred quality. A non-preferred quality, is a quality less than the preferred quality. The quality may be a transmission rate, which may be a vocoder transmission rate, which is a rate slower than the preferred quality transmission rate. The non-preferred quality may also be a transmission power which is a power less than the preferred quality transmission power. The non-preferred quality may be a limited ability or inability of the non-preferred communication units to perform soft handoff. The non-preferred quality may be a restriction of the call area to less than the dispatch service area. The non-preferred quality may be a selective dropping of outlying communication units. The non-preferred quality may also be any combination of the above, e.g., the non-preferred quality may be a transmission power lower than the preferred quality transmission power and a rate less than the preferred quality transmission rate. In the preferred embodiment, the preferred quality is a first transmission rate, and the non-preferred quality is a rate one-half the preferred rate. For example, if the preferred quality is 12 kHz, then the non-preferred quality would be a 6 kHz signal, leaving 6 kHz of bandwidth available for reuse. In the preferred embodiment, the message transmitted at step 209 is transmitted by base stations that are participating in the call, but are not transmitting message at a preferred quality at step 207. In other words, if there are ten base stations participating in the call, and two base stations are transmitting at the preferred quality at step 207, then the remaining eight base stations will transmit the same message at step 209 at the non-preferred quality. In this way, at the base stations transmitting at the non-preferred quality level, one-half of the bandwidth is saved at these base stations, which bandwidth may be reallocated for other messages, thereby saving an amount of bandwidth or resources necessary, for example, to establish another dispatch call. After step) 209, the process continues with step 213.

If at step 205 there are no preferred communication units found, the process continues with step 211, where the originating device continues to transmit at the non-preferred quality. At step 213, it is determined if the call has been completed, and if it has not been completed, the process continues with step 205, but if the call is completed, the process ends.

An additional feature of the preferred embodiment is to reduce the power or communication rate of the non-preferred communication units not actively sending messages (e.g., those in receive-only mode) on the inbound or reverse channel once all the communication units are on line and participating in the call, so as to reduce traffic on the inbound or reverse channel. If, for example, a communication unit normally transmits at ⅛ rate when it has no messages to transmit, power may be conserved by reducing the rate to ¹⁄₂₄ of the normal rate in order to keep traffic down and conserve power. Instead of transmitting at ⅛ frame rate when in receive-only mode, the non-preferred communication unit transmits 1 control frame every 24 frames in order to maintain forward channel power control and notify the base station that it is still listening to the forward channel, all this without putting undue interference on the reverse channel.

Figure 3:
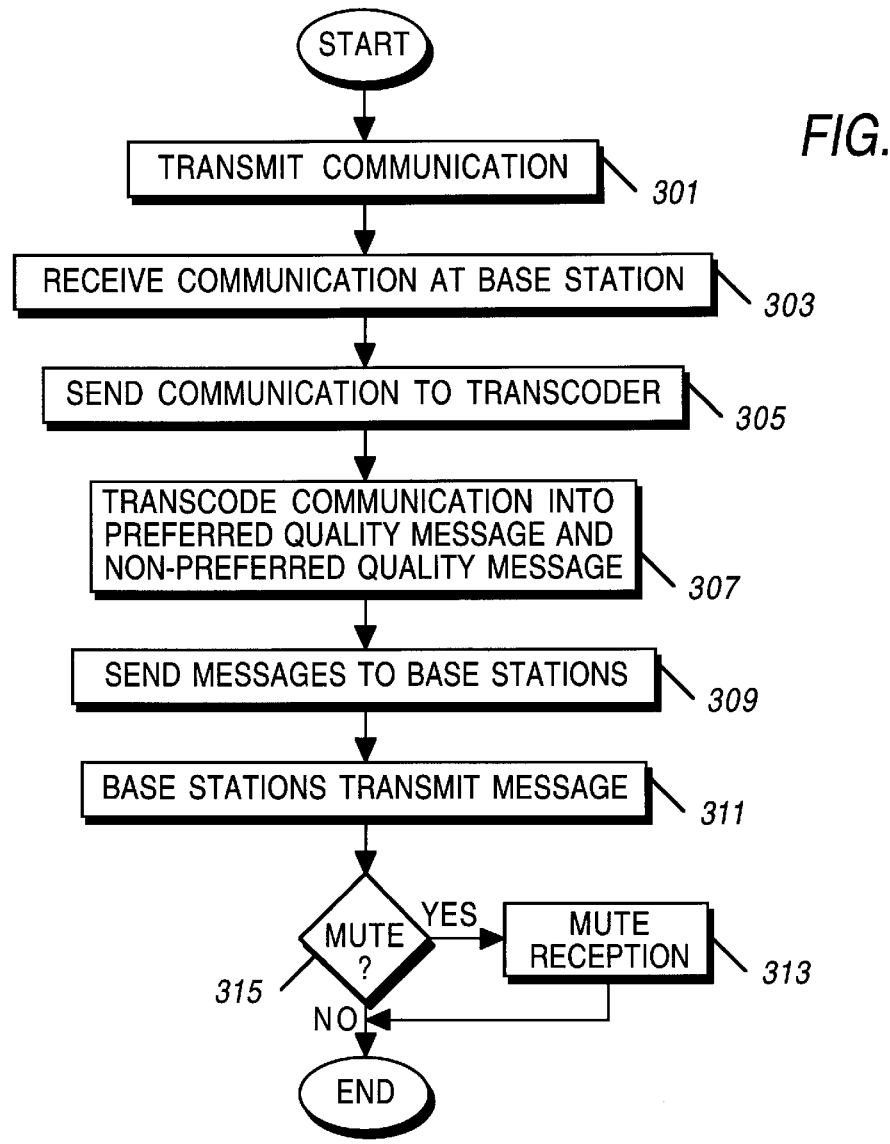
FIG. 3 is a flowchart showing a method of transmitting dispatch messages throughout a wireless communication system in accordance with the invention.
Figure 4:
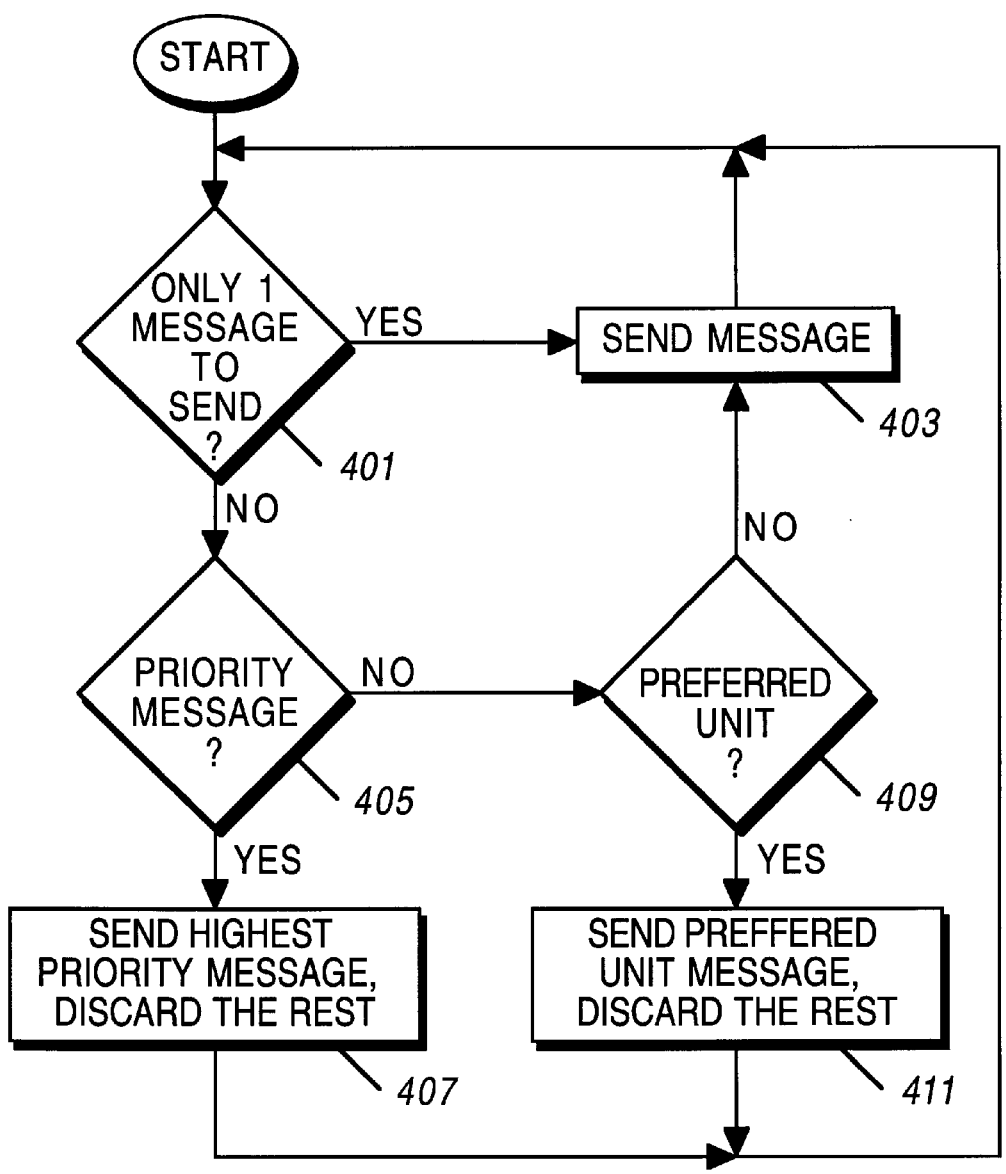
FIG. 4 is a flowchart showing a method of handling conflicts when more than one message is provided for transport on the forward communication resource at one time.

A flowchart showing a method of a dispatch message being transmitted throughout the communication system is shown in FIG. 3. At step 301, a communication is transmitted by an originating communication unit 107 or 109, console, or other device. At step 303, the communication is received at a base station. Alternatively, at step 303, the communication is received at a BSC if the communication originated from a wireline connection to the wireless communication system, e.g., a PSTN call or a wireline console. At step 305, the communication is sent to the transcoder 111. In case there is more than one message that is provided for transport on the forward communication resource at one time, FIG. 4 shows a method of handling such conflicts and thus deciding which communication is sent to the transcoder at step 305. At step 307, the transcoder 111 transcodes the communication into a preferred quality message and a non-preferred quality message. At step 309, the preferred quality message is sent to the base stations that will transmit the preferred quality message and the non-preferred quality message is sent to the base stations that will transmit the non-preferred quality message. At step 311, the base stations transmit an appropriate message, based on the preferred status for that particular call. At step 313, if the communication unit is presently transmitting, it compares its own transmitted, or inbound signal, the encoded message before modulation, to the demodulated signal it is receiving, and at step 315 mutes its own reception if the transmitted encoded message signal and the received demodulated signal are substantially the same. The two signals are considered to be substantially the same if the number of errors between the two signals falls within an acceptable tolerance, such as an acceptable bit error rate.

A method of handling conflicts when more than one message is provided for transport on the forward communication resource at one time is shown in FIG. 4. In the preferred embodiment, the method of FIG. 4 is performed by the BSC 101. At step 401, it is determined if only one message is intended to be sent on the forward communication resource. If only one message is intended to be sent on the forward communication resource, then the process continues with step 403, where the message is sent, and the process continues with step 401. If more than one message is intended to be sent on the forward communication resource at step 401, then the process continues with step 405, where it is determined if one of the messages is a priority message. Priority messages include messages designated as priority messages within the communication system, including emergency messages and messages from users designated as priority users, such as wireline users or highly-prioritized wireless users. If one of the messages is a priority message at step 405, the process continues with step 407, where the highest priority message is sent, the other messages are discarded, and the process continues with step 401. If one of the messages is not a priority message at step 405, the process continues with step 409, where it is determined if any of the messages is from a preferred unit. If one of the messages is from a preferred unit at step 409, the process continues with step 411, where the preferred unit message is sent, the other messages are discarded, and the process continues with step 401. If one of the messages is not from a preferred unit at step 409, the process continues with step 403. In this way, only one message is transmitted of all the possible messages that are presented to the BSC 101.

Communication units that are in soft handoff condition along a seam between a base station(s) transmitting a preferred quality- signal and a base station(s) transmitting a non-preferred quality signal, must decide how to combine the received signals. In the preferred embodiment, the communication unit independently demodulates and decodes the two signals and passes on the decoded preferred quality signal if it is received without error. In an alternative embodiment, the communication unit selects which signal to demodulate based on the received signal quality.

The present invention therefore provides a method of reducing the quality level of the signal for non-preferred communication users, such that bandwidth may be conserved during a dispatch call. If either the transmission rate or the communication power are reduced for non-preferred messages, then the bandwidth saved by such conservation may be reused for other communication units, for other types of communications, or other dispatch calls. The present invention may be used all the time or may be used only during busy hours or regions where traffic is high.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   establishing a dispatch call in a wireless communication system;
   determining a first preferred communication unit (MS);
   transmitting a first part of a message to at least the first preferred communication unit at a preferred quality;
   transmitting the first part of the message to at least one communication unit that is not a preferred communication unit at a quality less than the preferred quality, wherein the preferred quality comprises a first transmission rate, and the quality less than the preferred quality comprises a rate slower than the first transmission rate.

2. The method of claim 1, wherein the first transmission rate is a vocoder transmission rate.

3. The method of claim 1, wherein the preferred quality further comprises a first transmission power, and the quality less than the preferred quality further comprises a power less than the first transmission power.

4. The method of claim 1, further comprising the steps of:
   determining a second preferred communication unit;
   transmitting a second part of the message to at least the second preferred communication unit at the preferred quality;
   transmitting the second part of the message to at least one communication unit that is not a preferred communication unit at a quality less than the preferred quality.

5. The method of claim 1, further comprising the steps of:
   determining that the first preferred communication unit is no longer preferred;
   transmitting a second part of the message to at least the first preferred communication unit that is no longer preferred at the quality less than the preferred quality.

6. The method of claim 1, wherein the preferred communication unit compares an outbound signal to a received signal and mutes the preferred communication unit's reception if the outbound signal and the received signal are substantially the same.

7. The method of claim 1, wherein the wireless communication system is a CDMA system.

8. The method of claim 1, wherein the wireless communication system is a cellular system.

9. The method of claim 1, wherein the first part of the message is transmitted to two or more preferred communication units at the preferred quality.

10. The method of claim 1, wherein the first part of the message is transmitted to two or more communication units at a quality less than the preferred quality.

11. A method comprising the steps of:
    establishing a dispatch call in a wireless communication system;
    determining a first preferred communication unit (MS);
    transmitting a first part of a message to at least the first preferred communication unit at a preferred quality;
    transmitting the first part of the message to at least one communication unit that is not a preferred communication unit at a quality less than the preferred quality;
    transmitting, by an originating communication unit, a communication;
    receiving, at a first base station, the communication;
    sending the communication to a transcoder;
    transcoding, by the transcoder, the communication into the first part of the message at the preferred quality and into the first part of the message at the quality less than the preferred quality.

12. The method of claim 11, further comprising the step of sending the first part of the message at the preferred quality to the first base station.

13. The method of claim 11, further comprising the step of sending the first part of the message at the quality less than the preferred quality to a base station not servicing a preferred communication unit.

14. A method comprising the steps of:
    establishing a dispatch call in a wireless communication system;
    assuming all communication units participating in the dispatch call are non-preferred communication units;
    transmitting a first part of a first message to the non-preferred communication units at a non-preferred quality;
    receiving a part of a second message from a first communication unit;
    considering the first communication unit as a first preferred communication unit;
    transmitting a second part of the first message to at least the first preferred communication unit at a preferred quality;
    transmitting the second part of the first message to at least one communication unit that is not the first preferred communication unit at the non-preferred quality, wherein the preferred quality comprises a first transmission rate, and the quality less than the preferred quality comprises a rate slower than the first transmission rate.

15. The method of claim 14, where the step of transmitting the first part of the first message to the non-preferred communication units at the non-preferred quality is performed by all base stations participating in the dispatch call.

16. The method of claim 14, where the step of transmitting the second part of the first message to at least the first preferred communication unit at the preferred quality is performed by a base station servicing the first preferred communication unit in the dispatch call.

17. The method of claim 14, where the step of transmitting the second part of the first message to at least one communication unit that is not the first preferred communication unit at the non-preferred quality is performed by a base station not servicing the first preferred communication unit in the dispatch call.

18. The method of claim 14, further comprising the steps of:
    transmitting, by an originating communication unit, a communication;
    receiving, at a first base station, the communication;
    sending the communication to a transcoder;
    transcoding, by the transcoder, the communication into the first part of the first message at the non-preferred quality.

* * * * *